(12) United States Patent
Liu et al.

(10) Patent No.: US 12,449,433 B2
(45) Date of Patent: Oct. 21, 2025

(54) AUTOMATED METHOD FOR DIRECT SAMPLING OF IMMUNE CELLS FROM WHOLE BLOOD OR OTHER BIOLOGICAL SAMPLES IN MICROWELL PLATES

(71) Applicant: Sartorius BioAnalytical Instruments, Inc., Bohemia, NY (US)

(72) Inventors: Zhaoping Liu, Ann Arbor, MI (US); Stephen Barnes, Ann Arbor, MI (US); Dominique Perez, Ann Arbor, MI (US); Christopher Suski, Ann Arbor, MI (US)

(73) Assignee: Sartorius BioAnalytical Instruments, Inc., Bohemia, NY (US)

( * ) Notice: Subject to any disclaimer, the term of this patent is extended or adjusted under 35 U.S.C. 154(b) by 878 days.

(21) Appl. No.: 17/009,225

(22) Filed: Sep. 1, 2020

(65) Prior Publication Data

US 2022/0065879 A1    Mar. 3, 2022

(51) Int. Cl.
| | |
|---|---|
| *G01N 35/00* | (2006.01) |
| *G01N 33/50* | (2006.01) |
| *G01N 35/10* | (2006.01) |

(52) U.S. Cl.
CPC ..... *G01N 35/0098* (2013.01); *G01N 33/5002* (2013.01); *G01N 35/0099* (2013.01); *G01N 35/10* (2013.01); *G01N 2035/00524* (2013.01); *G01N 2035/00564* (2013.01); *G01N 2035/1053* (2013.01)

(58) Field of Classification Search
None
See application file for complete search history.

(56) References Cited

U.S. PATENT DOCUMENTS

| | | | |
|---|---|---|---|
| 4,702,610 A * | 10/1987 | Reynolds, Jr. ........ | B01F 35/422 366/208 |
| 4,910,148 A * | 3/1990 | Sorensen ............. | B03C 1/01 436/526 |
| 6,514,415 B2 | 2/2003 | Hatch et al. | |
| 6,605,213 B1 | 8/2003 | Ammann et al. | |
| 6,689,615 B1 | 2/2004 | Murto et al. | |
| 6,890,487 B1 | 5/2005 | Sklar et al. | |
| 7,569,789 B2 | 8/2009 | Hayenga et al. | |
| 7,764,821 B2 | 7/2010 | Coumans et al. | |
| 8,110,393 B2 | 2/2012 | Aparicio et al. | |
| 8,187,886 B2 | 5/2012 | Faustman et al. | |
| 8,906,309 B2 | 12/2014 | Krokenberger et al. | |
| 9,063,044 B2 * | 6/2015 | Kao .................. | B01L 9/523 |
| 9,618,518 B2 | 4/2017 | Fauconnier et al. | |
| 9,797,917 B2 | 10/2017 | Barnes et al. | |
| 9,897,531 B2 | 2/2018 | Andreev et al. | |
| 10,048,191 B2 | 8/2018 | Kennington | |
| 10,081,793 B2 | 9/2018 | Kokaji | |
| 2002/0142288 A1 | 10/2002 | Kaultkiewicz | |
| 2011/0088491 A1 * | 4/2011 | Krueger .............. | B01F 31/27 73/863.11 |
| 2013/0122513 A1 | 5/2013 | Petersson | |
| 2013/0130280 A1 | 5/2013 | Fauconnier | |
| 2016/0011083 A1 * | 1/2016 | Barnes .............. | G01N 35/1011 356/246 |

FOREIGN PATENT DOCUMENTS

| | | | |
|---|---|---|---|
| CN | 104111333 | 10/2014 | |
| EP | 0479448 | 9/1991 | |
| EP | 2732878 | 5/2014 | |
| EP | 3470141 A1 * | 4/2019 | ........ B01L 3/502761 |
| JP | 2010/060516 | 3/2010 | |
| WO | 1988/07199 | 9/1988 | |
| WO | 1992/05443 | 4/1992 | |
| WO | 2012010666 A1 | 1/2012 | |

OTHER PUBLICATIONS

Teleshake Manual (Thermo Scientific Magnetic Shaker Operating Manual, Issue Mar. 2012, Downloaded from: https://www.manualslib.com/manual/2846421/Thermo-Scientific-Teleshake-1536-6.html), pp. 10 (Year: 2012).*
Gordon R, Hogan CE, Neal ML, Anantharam V, Kanthasamy AG, Kanthasamy A. A simple magnetic separation method for high-yield isolation of pure primary microglia. J Neurosci Methods. Jan. 15, 2011;194(2):287-96. Epub Nov. 11, 2010 (Year: 2011).*
Belly Dancer Shaker YouTube Video (YouTube video clip entitled "Stovall The Belly Dancer Shaker" uploaded on Feb. 7, 2019 by user "The Lab World Group". Retrieved from Internet: <https://www.youtube.com/watch?v=wnwc8Znwaow> on Sep. 25, 2023) (Year: 2019).*
Screen captures from Belly Dancer Shaker YouTube Video (YouTube video clip entitled "Stovall The Belly Dancer Shaker", 3 pages , uploaded on Feb. 7, 2019 by user "The Lab World Group". Retrieved from Internet: <https://www.youtube.com/watch?v=wnwc8Znwaow> on Sep. 29, 2023) (Year: 2019).*
Tecan YouTube Video (YouTube video clip entitled "Magnetic bead separation with HydroFlex™ microplate washer," uploaded on Jun. 18, 2012 by user "Tecan". Retrieved from Internet: <https://www.youtube.com/watch?v=aGwZm1-GnPg> on Sep. 25, 2023) (Year: 2012).*

(Continued)

*Primary Examiner* — Gregory S Emch
*Assistant Examiner* — Fernando Ivich
(74) *Attorney, Agent, or Firm* — McDonnell Boehnen Hulbert & Berghoff LLP

(57) ABSTRACT

The present disclosure provides a method for automatic sampling of immune cells from a biological fluid sample, e.g., whole blood, deposited in a well of a microwell plate. The microwell plate is placed on a shaker having a magnetic adapter including at least one magnet. The magnet causes red blood cells (RBCs) bound to magnetic beads to be attracted to and migrate to a wall of the well. The shaker is then operated to shake the microwell plate such that the immune cells are substantially isolated from the RBCs in a region of the well. A sample probe is then lowered into the region of the well to withdraw a portion of the sample containing the immune cells.

19 Claims, 8 Drawing Sheets

(56) References Cited

OTHER PUBLICATIONS

Screen captures from Tecan YouTube Video (YouTube video clip entitled "Magnetic bead separation with HydroFlex™ microplate washer," 3 pages, uploaded on Jun. 18, 2012 by user "Tecan". Retrieved from Internet: <https://www.youtube.com/watch?v=aGwZm1-GnPg> on Sep. 29, 2023) (Year: 2012).*

Miltenyi Biotec YouTube Video (YouTube video clip entitled "96-well flow cytometry analysis on the MACSQuant Analyzer," uploaded on Apr. 15, 2015 by user "Miltenyi Biotec". Retrieved from Internet: <https://www.youtube.com/watch?v=tFC_5GpL4tk> on Sep. 25, 2023) (Year: 2015).*

Screen captures from Miltenyi Biotec YouTube Video (YouTube video clip entitled "96-well flow cytometry analysis on the MACSQuant Analyzer," uploaded on Apr. 15, 2015 by user "Miltenyi Biotec". Retrieved from Internet: <https://www.youtube.com/watch?v=tFC_5GpL4tk> on Sep. 29, 2023) (Year: 2015).*

Thermo Scientific, Thermo Scientific Magnetic Stirrers, 2012, (16 pages). Downloaded from: https://www.thermofisher.com/document-connect/document-connect.html?url=https://assets.thermofisher.com/TFS-Assets%2FLED%2Fbrochures%2FD20897~.pdf (Year: 2012).*

Shaker Tecan YouTube Video (YouTube video clip entitled "Keeping cells in suspension in a deep well plate on a shaker", uploaded on Sep. 20, 2016 by user "Tecan". Retrieved from Internet: <https://www.youtube.com/watch?v=m7rfSDwu1CQ> on Mar. 28, 2024) (Year: 2016).*

Screen captures from Shaker Tecan YouTube Video (YouTube video clip entitled "Keeping cells in suspension in a deep well plate on a shaker", 3 pages, uploaded on Sep. 20, 2016 by user "Tecan". Retrieved from Internet: <https://www.youtube.com/watch?v=m7rfSDwu1CQ> on Mar. 28, 2024) (Year: 2016).*

International Search Report and Written Opinion for PCT/US2021/043530 mailed Jan. 26, 2022.

Brochure, Stemcell products EasySep direct (Nov. 2018), (2 pages).

Web page https://www.stemcell.com/easyplate-magnet-fast-easy-cell-isolation-in-a-96-well-plate.html (2012), (7 pages).

BioMag 96 well plate side pull separator.pdf (Mar. 12, 2013), (1 page).

BioMag 96 well plate side plate separator.pdf (Mar. 12, 2013), (1 page).

Web page https://www.stemcell.com/easysep-direct-cell-isolation, retrieved Jan. 3, 2024.

Thermofisher https://www.thermofisher.com/us/en/home/life-science/cell-analysis/flow-cytometry/flow-cytometry-learning-center/flow-cytometry-resource-library/flow-cytometry-application-notes/no-wash-no-lyse-detection-leukocytes-human-whole-blood-attune-nxt-flow-cytometer.html, retrieved Jan. 3, 2024.

* cited by examiner

Add User-specified Treatment and/or Staining Cocktails

Whole Blood Assay Well

Add anti-RBC Ab-coated Magnetic Beads Incubation < 5 mins

Apply Magnet

Shaker (No Shaking)

Quick Shake @ Specific Speed to Suspend WBC's Only

Shaker (Shaking)

Sample Acquisition

Shaker (No Shaking)

AUTOMATED METHOD FOR DIRECT SAMPLING OF IMMUNE CELLS FROM WHOLE BLOOD OR OTHER BIOLOGICAL SAMPLES IN MICROWELL PLATES

BACKGROUND

This disclosure relates to a method for direct sampling of cells, such as immune cells (lymphocytes, neutrophils, monocytes, and macrophages, or generally leukocytes or white blood cells (WBCs)), from biological fluid samples which are loaded into the wells of a microwell plate. One particular application for the present method is a direct sampling of immune cells from whole blood samples. The method is also suitable for direct sampling of immune cells from other biological fluid samples which may contain red blood cells (RBCs), such as a cyst fluid sample, amniotic fluid, a bone marrow sample, or a cerebrospinal fluid sample.

The term "microwell plate" is used to refer to a test device format in the form of a flat plate forming an array of many small individual sample-holding wells, typically 6, 12, 24, 48, 96, 384 or more wells per plate, or to refer to a test device format in the form of a test tube array, typically 40 test tubes in an array. The term is sometimes referred to in the art as a "microtiter plate" or "microplate."

Such microwell plates are typically used in conjunction with a sample processing apparatus, which automatically extracts a portion of the sample from one of the wells and introduces the sample into an analytical instrument, for example a flow cytometer, hematology analyzer, cell sorter, mass spectrometer, etc. which conducts one or more measurements of the extracted sample.

Sampling whole blood with a cytometer for white blood cells (WBCs) analysis is difficult because whole blood tends to clog small flow paths. Also, it is known that populations of WBCs and RBCs are difficult to distinguish on a traditional cytometer. Hence, the art has developed methods for removing RBCs from a whole blood sample. One method, red blood cell (RBC) lysis, uses a buffer solution such as ammonium chloride, which lyses RBCs with minimal effect on leukocytes. The use of traditional RBC lysis methods in microplate format used for whole blood sample processing is labor intensive, it creates RBC debris that can clog the cytometer flow cell, makes the cytometer very dirty, and significantly increases the carryover from one sample to another. Further, the RBC lysis method may cause a loss of data integrity since the hypotonic buffer used in the lysis is not physiological and may affect the normal immune cell activity.

Another method, traditional gradient centrifugation, can be used for purification of WBCs and this method is used for samples in a test tube format, but it is not applicable for a microplate format.

Hence there is a need in the art for a method of automatically sampling immune cells from samples containing RBCs or other biological fluid samples in a microwell plate format.

SUMMARY

In one aspect of this disclosure, a method is provided for automatic sampling of cells, such as immune cells, from a biological fluid sample deposited in a well of a microwell plate, the well having a wall (i.e., a bottom wall or a side wall). The sample contains, for example, (1) RBCs and (2) magnetic beads which are conjugated to antibodies or otherwise designed to bind to RBCs in the sample. The method includes steps of: a) placing the microwell plate on a shaker having a magnetic adapter including a magnet, wherein the magnet causes the RBCs bound to the magnetic beads to be attracted to and migrate to the wall of the well and be held against the wall; b) shaking with the shaker the microwell plate in a manner and for a time period so as to suspend substantially evenly or homogeneously the immune cells in the biological fluid sample within a region of the well but still retain the holding of the RBCs to the wall of the well such that the immune cells are isolated from the RBCs in the region of the well; and c) lowering a sample probe into the well in the region of the well and withdrawing a portion of the sample containing the immune cells from the region.

In another aspect, a shaker system is described in the form of a shaker having a top surface that is configured for shaking a microwell plate in a controlled and programmable manner. The shaker includes a magnetic adapter cooperating with structures on the shaker so as to be removably fitted to the top surface of the shaker. The magnetic adapter is in the form of a substantially flat structure holding an array of individual magnets, and wherein the magnetic adapter is configured to fit onto the top surface of the shaker and be sandwiched between the top surface of the shaker and the microwell plate.

In one configuration, the array of magnets is arranged in the magnetic adapter so as to be in registry with the bottoms of the wells of the microwell plate when the microwell plate is placed on top of the magnetic adapter.

In another configuration, the apparatus includes a control system for the shaker. The control system operates the shaker such that the shaker shakes the microwell plate in a manner and for a time period so as to suspend substantially evenly or homogeneously immune cells in a biological fluid sample within a region of the well but still retain the holding of magnetically bound RBCs to the wall of the well such that the immune cells are substantially isolated from the RBCs in the region of the well.

In yet another aspect, a flow cytometer is provided, which includes a robotic sampling probe, a shaker having a top surface, and a magnetic adapter designed to cooperate with structures on the shaker so as to be removably fitted to the top surface of the shaker. Further, the magnetic adapter has one or more features for holding a microwell plate placed thereon. The magnetic adapter can take the form of a substantially flat structure holding an array of individual magnets and is configured to be sandwiched between the shaker and the microwell plate. The flow cytometer includes a control system for the shaker, configured for shaking the microwell plate in a manner and for a time period so as to suspend substantially evenly or homogeneously cells, such as immune cells, in a biological fluid sample placed in a well of the microwell plate. The immune cells are suspended within a region of the well but still retain the holding of the magnetically bound RBCs to a wall of the well due to one or more of the magnets such that the immune cells are substantially isolated from the RBCs in the region of the well. The flow cytometer also includes analytical instrumentation for counting, sorting or performing other measurements on immune cells withdrawn from a well of the microwell plate, wherein the probe withdraws the immune cells from the well and introduces the immune cells into the instrumentation.

BRIEF DESCRIPTION OF THE DRAWINGS

FIG. 9 also shows an associated workstation which is used for displaying analytical results from the flow cytometer.

FIG. 10 also shows a sampling probe connected to a three-axis robotic movement system which enables all the wells to be sampled.

DETAILED DESCRIPTION

Overview

In one aspect of this disclosure, a method is provided for automatic sampling of cells, such as immune cells, from a biological fluid sample containing red blood cells (RBCs) deposited in a well of a microwell plate. In the following description, the fluid sample is described as whole blood, but as stated previously, the sample can be other biological fluids containing mixed particle populations, such as red blood cells, other cell types, or particles of noninterest, and so on. These fluids can be, for example, amniotic fluid, cerebrospinal fluid, etc.

Figure 1A:
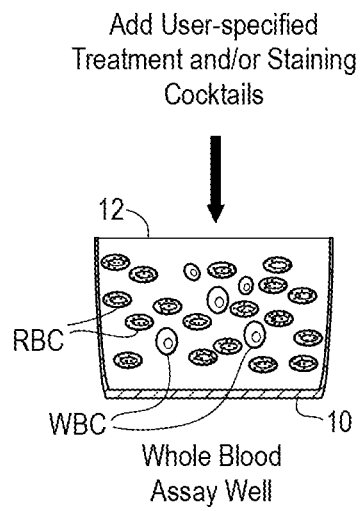
FIGS. 1A-1E are an illustration of a workflow or method for automatically sampling cells, such as immune cells, from a biological fluid sample containing red blood cells, e.g., a whole blood sample, in a microwell plate format, consisting of preliminary steps shown in FIGS. 1A and 1B, and then steps shown in FIGS. 10, 1D and 1E.
Figure 1B:
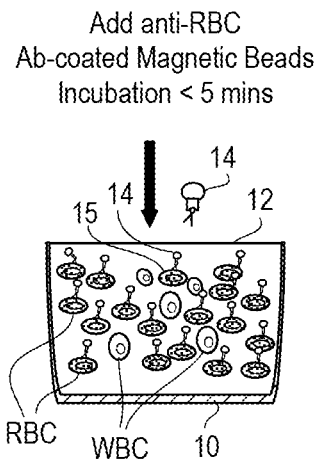
Figure 1C:
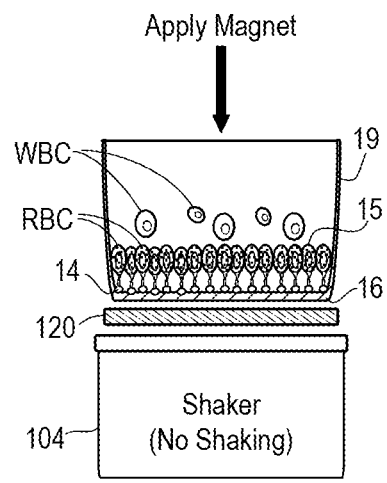

The methodology is shown in FIGS. 1A-1E, consisting of preliminary steps shown in FIGS. 1A and 1B, and then steps 10, 1D and 1E. The process will further be explained in conjunction with FIGS. 2 and 3. It will be appreciated from the following description that the process shown for a single well 10 of a microwell plate 100 (FIG. 2) is performed for all the wells which have been loaded with the sample 12 (e.g., whole blood).

At step A (FIG. 1A), user-specified treatment and/or staining cocktails (reagents) are added to the sample 12. Such reagents could include marker beads for well identification (well-ID) for samples with few white blood cells (WBCs), in-well counting beads to facilitate WBCs counting, staining agents, or possibly others.

At step B (FIG. 1B), magnetic beads 14 which are conjugated to antibodies or otherwise designed to bind to RBCs 15 in the sample are added to the sample 12. An example of such beads are anti-human CD235 antibody-coated magnetic beads. The antibodies coated on the magnetic beads are not limited to the antibodies against a CD235 molecule but can also be other antibodies against a molecule specifically expressed on RBCs but not on the WBCs. Further, the moiety molecules coated on the beads are not limited to antibodies, but could be other molecules such as antibody fragments, affimers, and antigens that can specifically bind to the molecules only expressed on RBCs but not on the WBCs.

Steps A and B can be performed on the laboratory bench, prior to insertion of a microwell plate 100 (FIG. 2) into an analytical instrument. After step B, the microwell plate 100 can be incubated for some period of time to allow the magnetic beads 14 to be conjugated to the RBCs 15, for example between one minute and two hours; the duration for incubation is flexible and the user can optimize.

At step C (FIG. 10), a magnetic separation of the RBCs 15 from the WBCs 17 in the sample 12 is performed. In particular, the microwell plate 100 is placed on top of a microtiter plate shaker 104, such as the BioShake® 3000, with the shaker 104 having a magnetic adapter 102 including a magnet 120 fitted or placed on top of the shaker 104. The magnet 120 attracts the magnetic beads 14 and causes the RBCs 15, bound to the magnetic beads 14, to be attracted to and migrate to a bottom wall 16 or a side wall 19 of the well 10 and be held against the wall 16 (or 19, depending on the location of the magnets). This action separates WBCs 17 into a layer above the RBCs 15, which are bound to the bottom wall 16 of the well 10. The magnetic adapter 102 is placed on top of the microtiter plate shaker and is designed to be removed from or inserted onto the top surface of the shaker 104 by a user without the use of special tools. The adapter 102 is thus sandwiched between the top of the shaker 104 and the microwell plate 100. Shaking is not performed at step C or, optionally, only very gentle shaking can be performed at step C, which allows the magnetic beads 14 to bind to the RBCs 15 and still pull down the RBCs 15 to the side wall 19 and/or the bottom wall 16 of the well 10, depending on the location of the magnets. In the embodiment where the magnets are positioned below the microwell plate the RBCs are pulled down to the bottom wall 16 as show in FIG. 10.

Figure 1D:
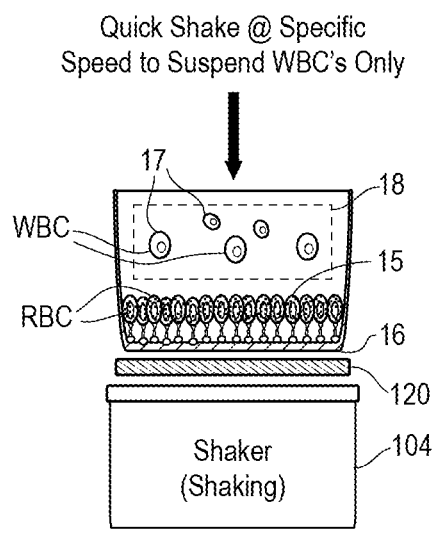

In step D (FIG. 1D), after the RBCs 15 settle down at the well bottom 16 as shown in FIG. 1D, the shaker 104 is turned on and shakes at a designated speed (revolutions per minute, rpm) within a certain range so as to only resuspend substantially evenly or homogenously the WBCs 17 in the top liquid layer (mostly serum and plasma), while the RBCs 15 will remain tightly attached at the well bottom 16 by virtue of the attraction of the conjugated magnetic beads 14 to the magnet. In other words, in this step the shaker 104 shakes the microwell plate 100 in a manner and for a time period so as to suspend and distribute substantially evenly or homogeneously the immune cells 17 (WBCs) in the biological fluid sample within a region of the well (indicated at 18) but still retain the holding of the RBCs to the bottom wall 16 and/or side wall 19 (FIG. 10) of the well 10 such that the immune cells 17 (WBCs) are substantially isolated from the RBCs in the region 18. The manner of performing the shaking (i.e., speed) is described in some detail below, the particulars of which may vary depending on the strength of the binding of the beads 14 to the RBCs 15, the design of the shaker 104 itself, the microwell plate 100 design, the liquid volume in each well, and may be experimentally determined for particular magnetic beads and a given shaker. After some predetermined time period, e.g., 10 seconds, the shaker 104 is turned off.

Figure 6:
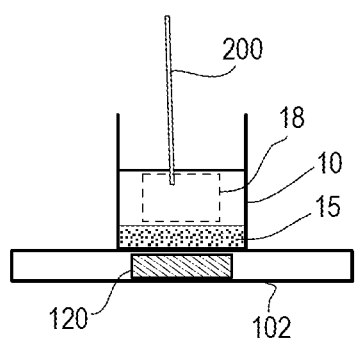
FIG. 6 is an illustration of a sampling probe inserted into one of the wells of the microwell plate of FIG. 2 withdrawing a sample from the well, in accordance with step E of FIG. 1E.

In step E (FIG. 1E), immediately after the shaking is concluded, or optionally while the shaking is ongoing, software with a specific sampling protocol governing operation of a sampling probe 200 automatically guides the sample probe 200 to insert the tip thereof into the top liquid layer (region 18) and to acquire a certain volume of WBCs 17 without contamination of RBCs 15 still magnetically held at the bottom of the well 16. This acquisition is performed by controlling a sampling height position of the sample probe 200. Thus, in this step the sample probe 200 is lowered into the well 10 in the region 18 of the well where the WBCs 17 are substantially evenly or homogenously suspended. A portion of the sample containing the immune cells is then withdrawn from the region 18. This is shown in FIG. 6.

After withdrawal of the WBC sample 17, the sample can be processed in an analytical instrument to which the probe 200 belongs, such as a flow cytometer. The sample is introduced into the analytical instrument, such as a sample introduction port, which conveys the sample to further analytical instrumentation which conducts measurements on the sample.

Shaker and Magnetic Adapter Design

Figure 2:
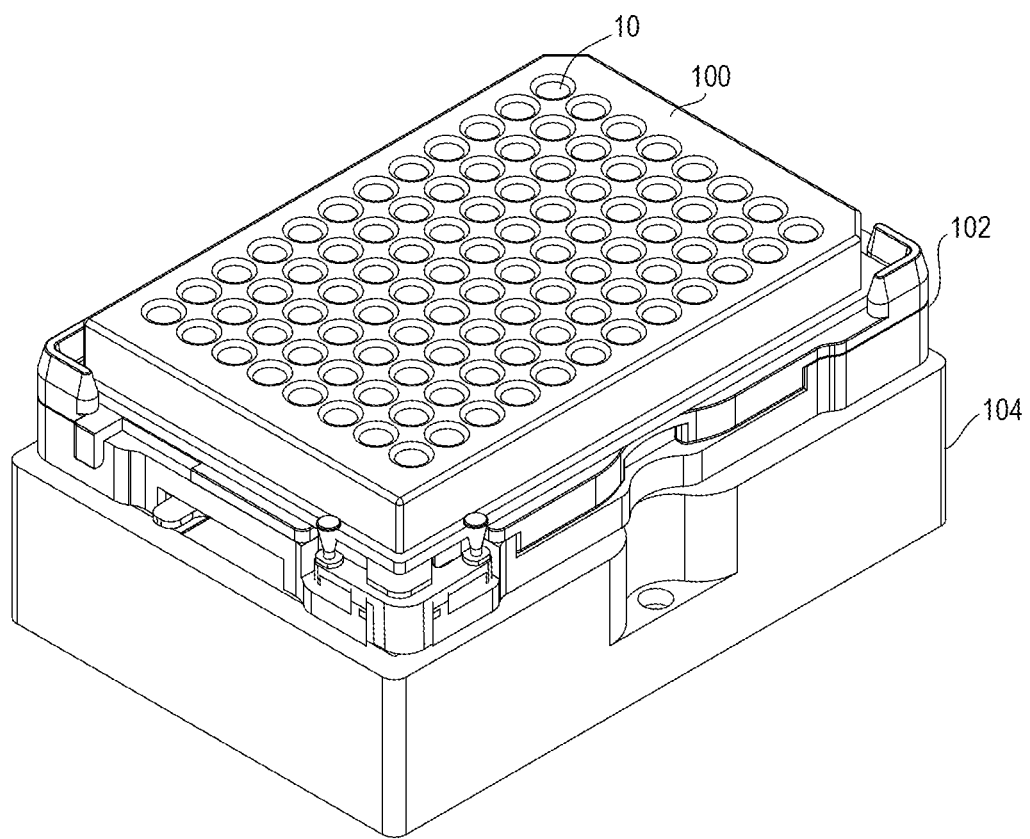
FIG. 2 is an illustration of a microwell plate positioned over a shaker in accordance with FIG. 1 and showing a magnetic adapter secured to the shaker and positioned between the shaker and the microwell plate.
Figure 3:
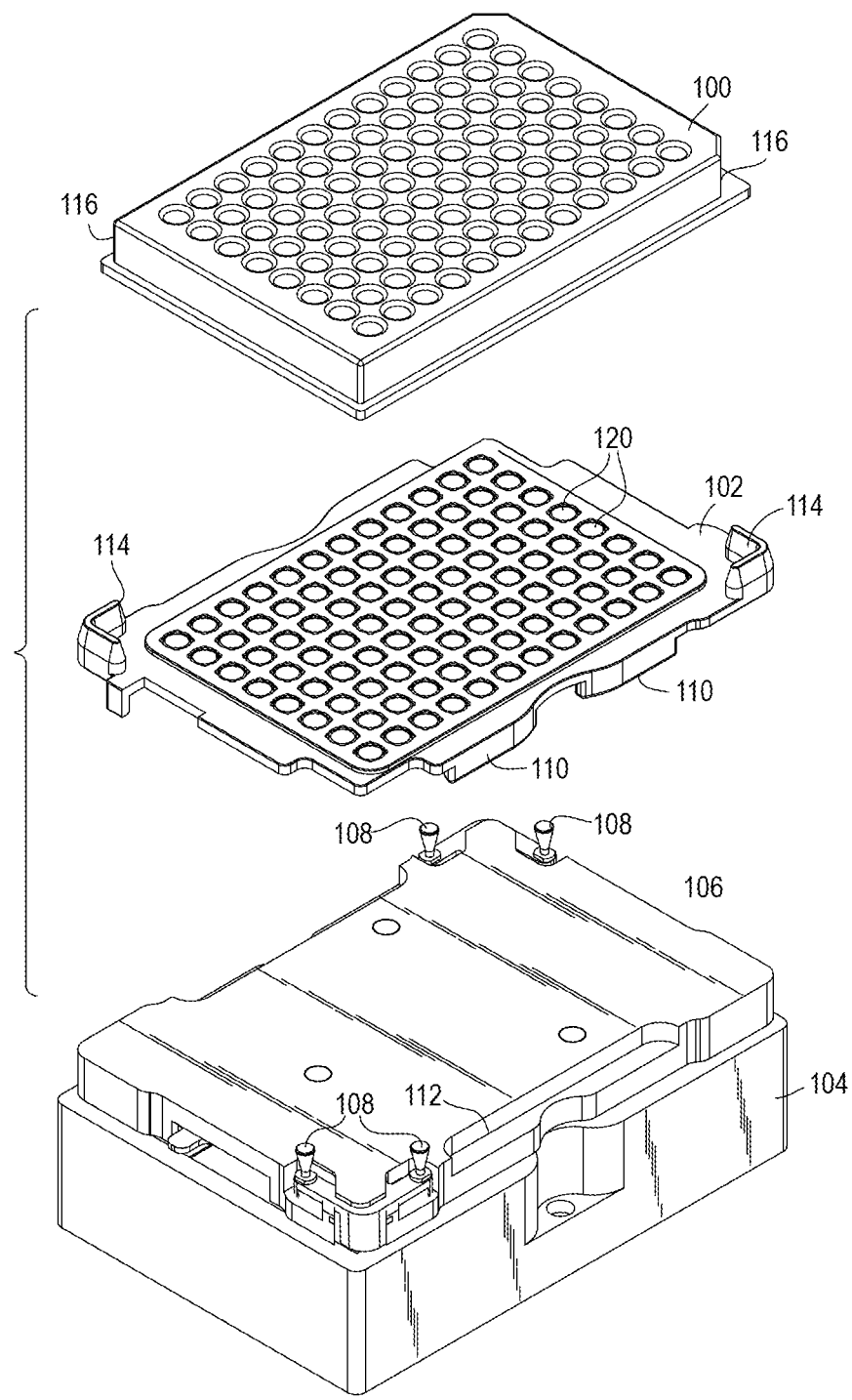
FIG. 3 is an exploded view of the assembly of FIG. 2.
Figure 4:
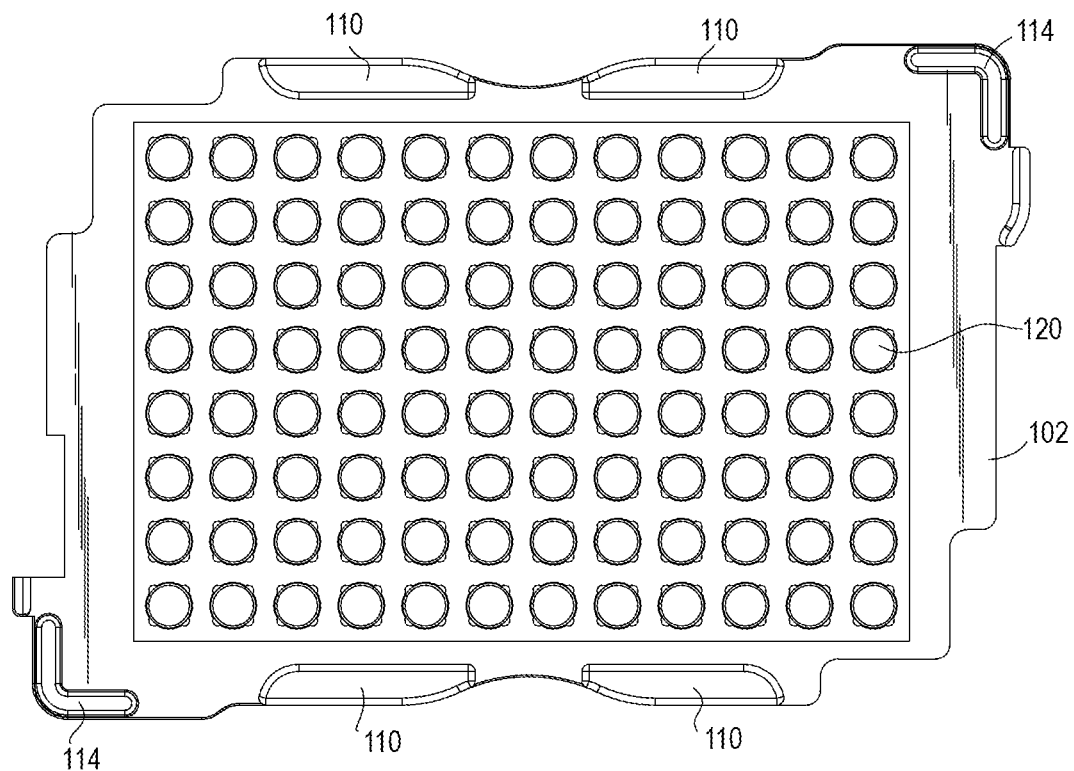
FIG. 4 is a top view of the magnetic adapter of FIGS. 2 and 3.
Figure 5:
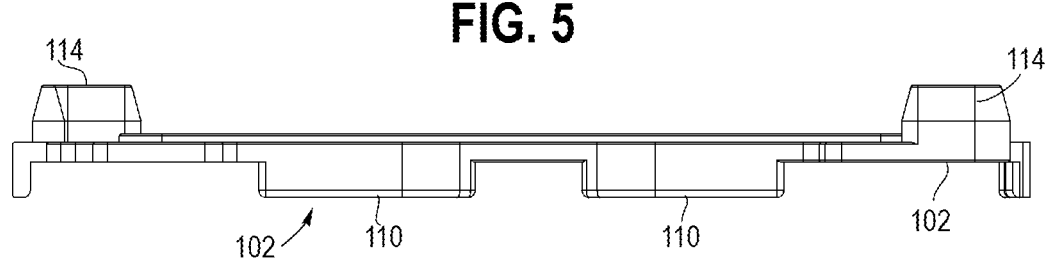
FIG. 5 is a side view of the magnetic adapter of FIG. 4.

Referring now to FIGS. 2-5, the shaker 104 can take the form of any of the commercially available devices designed to shake or agitate a microwell plate, such as the shaker mentioned previously. The shaker 104 typically is designed with an eccentric or orbital rotation to induce vortex action within the well and is programmably controlled to rotate at a predetermined or user-specified speed. For example, the eccentric offset may be 2 mm, and the optimal speed of rotation and duration is determined such that the desired even distribution of the WBCs 17 is achieved in the upper region 18 of the well without release of the RBCs 15 from the bottom of the well, for example 250 rpm for 10 seconds. Referring to FIG. 3, the magnetic adapter 102 can take the form of a substantially flat structure as shown holding individual magnets 120, one for each well 10 of the microwell plate 100. As an alternative, the magnets 120 on the adapter plate 102 can be configured as two or more magnets per well, or even two or more wells per magnet or a group of magnets. A configuration having exactly one magnet-per-well is not required, only that the magnets produce a substantially uniform magnetic field. The magnetic adapter 102 is configured to fit onto an upper surface 106 of the shaker 104 and be sandwiched between the upper surface 106 and the microwell plate 100 as shown in FIG. 2, wherein the magnets 120 cause the RBCs 15 to be held to the bottom wall of the well. The adapter plate 102 includes corner features 114 which are designed to hold the corners 116 of the microwell plate 100 and prevent the plate from being dislocated from the shaker 104 during shaking. In addition, the corner features 114 can be designed to guide the microwell plate 100 into the correct location when the user is placing it onto the adapter 102. The adapter 102 is designed to be readily attached to and removed from the shaker 104 manually without the use of tools. This can be achieved by resilient gripping skirts 110, for example, that descends from the adapter 102 which fit against a recess 112 provided in the front and rear sides of the shaker 104. Locating pins 108 project from the upper surface of the shaker 104, which serve to fit in corresponding recesses provided in the adapter plate 102 and snugly grip the adapter plate as shown in FIG. 2. Depending on the embodiment, the locating pins 108 can grip and hold the adapter plate 102 in place, or the microwell plate 100, or both.

The locating pins 108 can be computer-controlled to move into and out of a gripping position to grip the adapter plate 102. This feature can be important when the shaker 104 is used in an automation mode. In this mode, the software can automatically loosen or tighten the locating pins 108 when a robotic arm removes a microwell plate 100 from the shaker 104 and/or puts a new microwell plate on the shaker. When the magnetic adapter design includes a magnetic shield 302 (see the discussion of FIGS. 7 and 8), the existing grippers/locating pins 108 on some shakers (such as the BioShake® 3000) are not long enough to reach the microwell plate and hold it in place. One solution to this is to add further compliant gripping features (not shown) to the magnetic adapter. These compliant gripping features interact with the existing grippers/locating pins 108 on the BioShake® 3000 so that when the BioShake® 3000's locating pins 108 close, the compliant gripping features push to grip the microwell plate. Then, when the BioShake® 3000 locating pins 108 relax, the compliant gripping features on the magnetic adapter also relax and the microwell plate is released. Of course, these solutions can be applied to other shaker designs; indeed, the particular form factor and design of the magnetic adapter 102 of FIG. 3 can change in order to be compatible with the surface geometry, locating pins and grippers of any shaker in question, as well as the particular configuration of the microwell plate 100.

Figure 7:
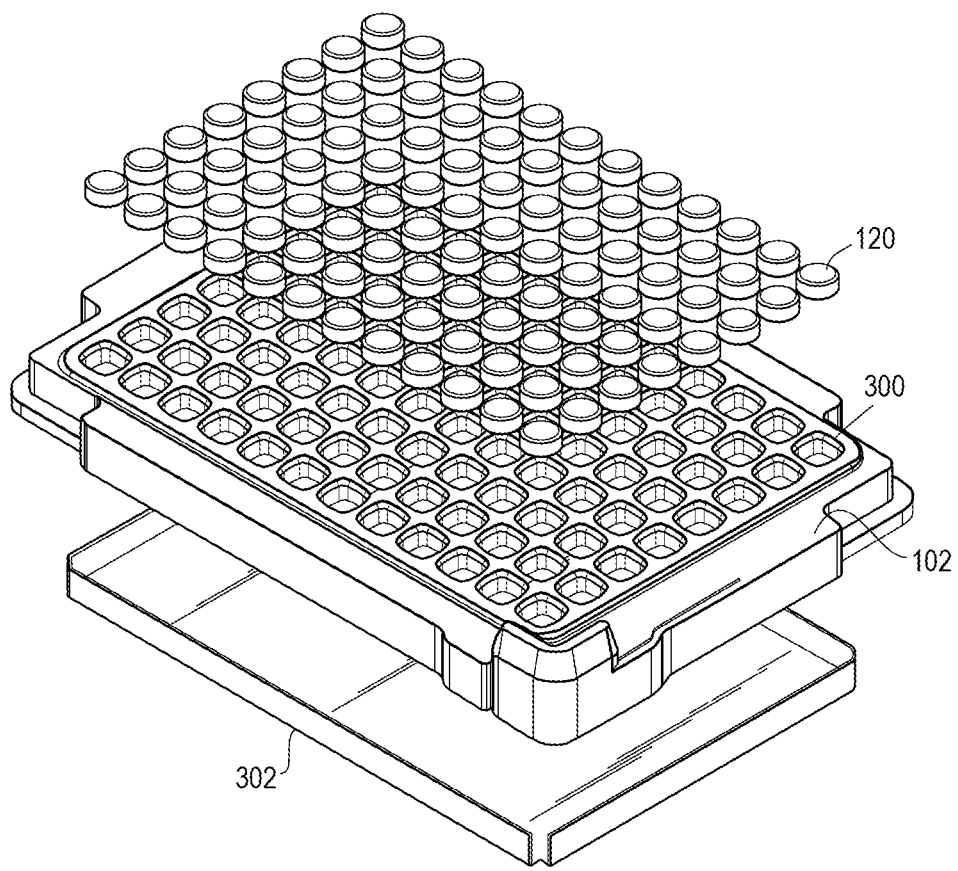
FIG. 7 is an exploded view of the magnetic adapter of FIG. 4 showing an optional ferromagnetic shield placed below and immediately adjacent to the lower surface of the magnetic adapter.

One possible configuration of the adapter plate 102 and magnets 120 is shown in an exploded view in FIG. 7. The adapter plate 102 has an array of recessed pockets 300, each of which receive and hold one of the magnets 120. The layout of the array of pockets 300 (and thus the magnets 120) is such that each magnet is designed to be positioned directly below a sample well in a standard format microwell plate. While FIG. 7 shows a 96 well plate, the same design consideration will apply to microwell plates with different numbers of wells, such as a 384 well plate. As an alternative, the magnets 120 on the adapter plate 102 can be configured as two or more magnets per well, or even two or more wells per magnet or a group of magnets. A configuration having exactly one magnet-per-well is not required, only that the magnets produce a substantially uniform magnetic field.

Figure 8:
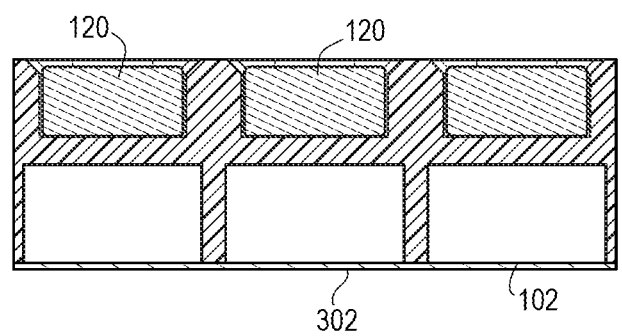
FIG. 8 is a partial cross-sectional view of the assembly of FIG. 7.

The shaker 104 typically is configured with a home position sensor, which can take the form of, for example, a hall-effect sensor. The presence of the magnets on the adapter plate 102 immediately above the shaker 104 produces a magnetic field which can interfere with the operation of the home position sensor in the shaker. To ameliorate this, in one optional embodiment, a ferromagnetic shield 302 (FIGS. 7, 8) in the form of a thin, flat plate of ferromagnetic material, such as stainless steel or mu-metal, is positioned below the adaptor plate 102 as shown in FIGS. 7 and 8 such that when the adapter plate 102 and shield 302 are placed on the shaker 104, the home position sensor operation is not adversely affected. The shield 302 can be mounted or affixed to the bottom surface of the magnetic adapter plate 102 in any suitable manner. The shield 302 redirects the magnetic field lines and reduces the field strength at the location of the home position sensor. Shield thickness and material is not especially critical provided it is made from a ferromagnetic material. However, increasing the separation distance between the shaker 104 and the magnets 120 and adding the shield 302 below the magnets 120 allows the shaker to operate correctly.

EXAMPLE

Flow Cytometer with Direct Sampling of Immune Cells from Whole Blood Samples in Microwell Plate (FIGS. 1, 9-11)

Figure 9:
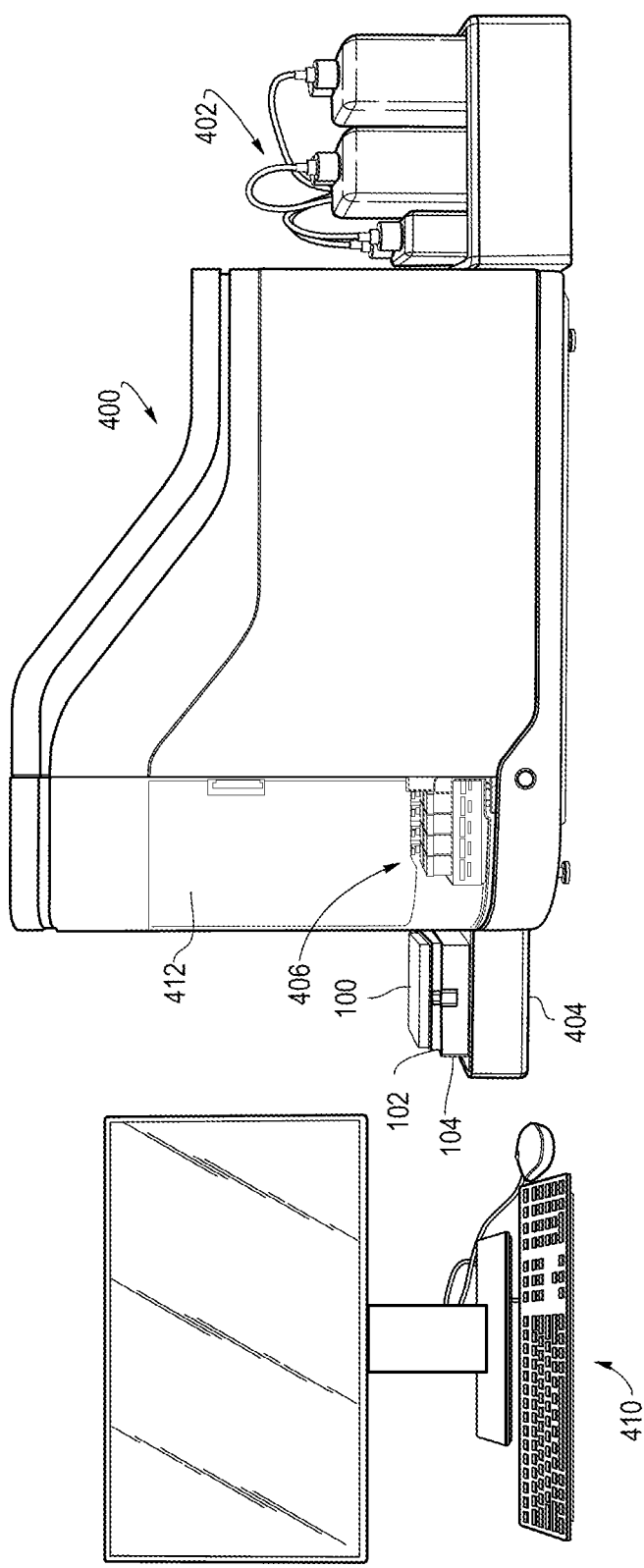
FIG. 9 is an illustration of a flow cytometer adapted for processing samples, including whole blood samples, in microwell plate format, which includes the shaker and magnetic assembly of FIG. 2.
Figure 10:
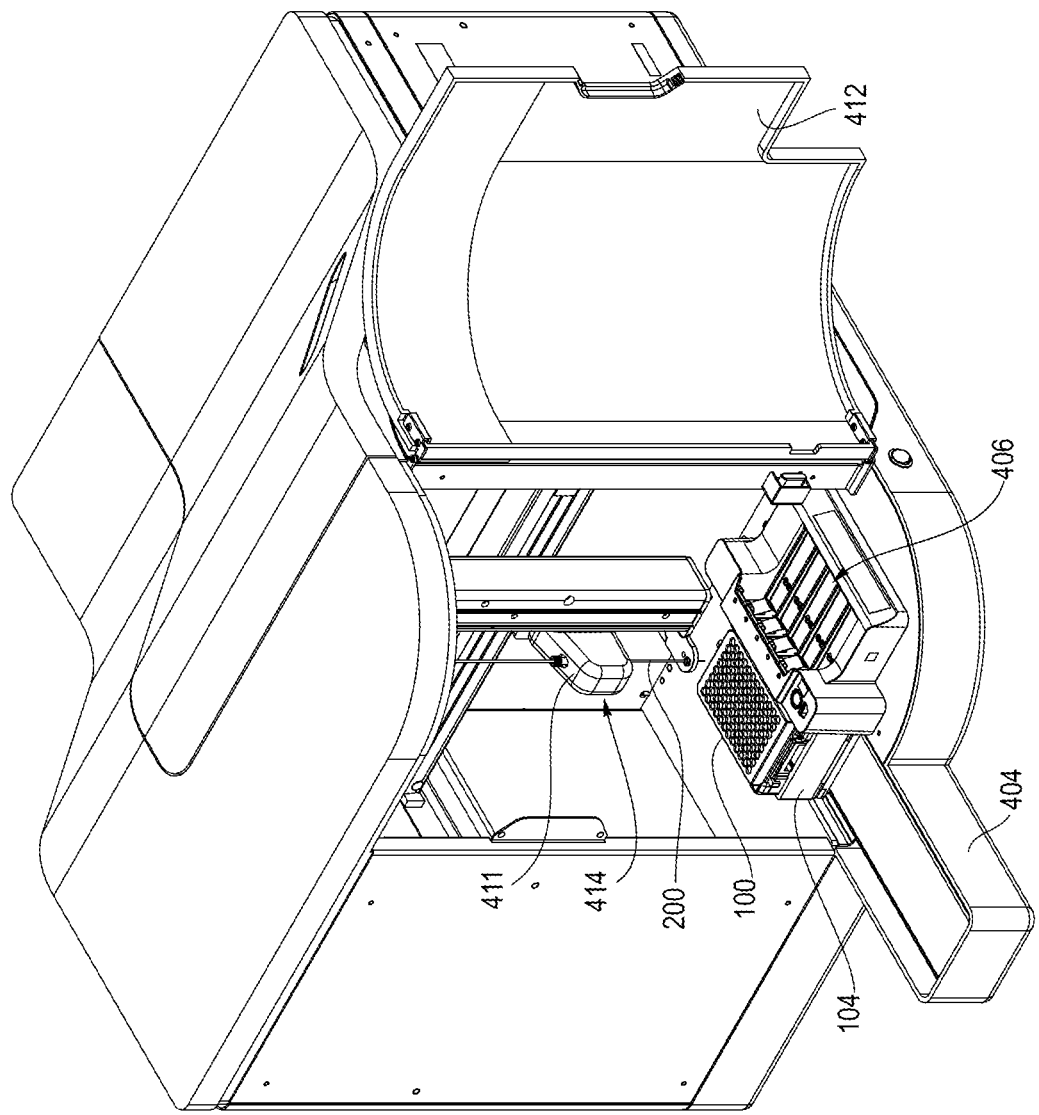
FIG. 10 is a perspective view of the flow cytometer of FIG. 9, with the shaker moved into the interior of the flow cytometer in position for various processing steps to be performed on the microwell plate.
Figure 11:
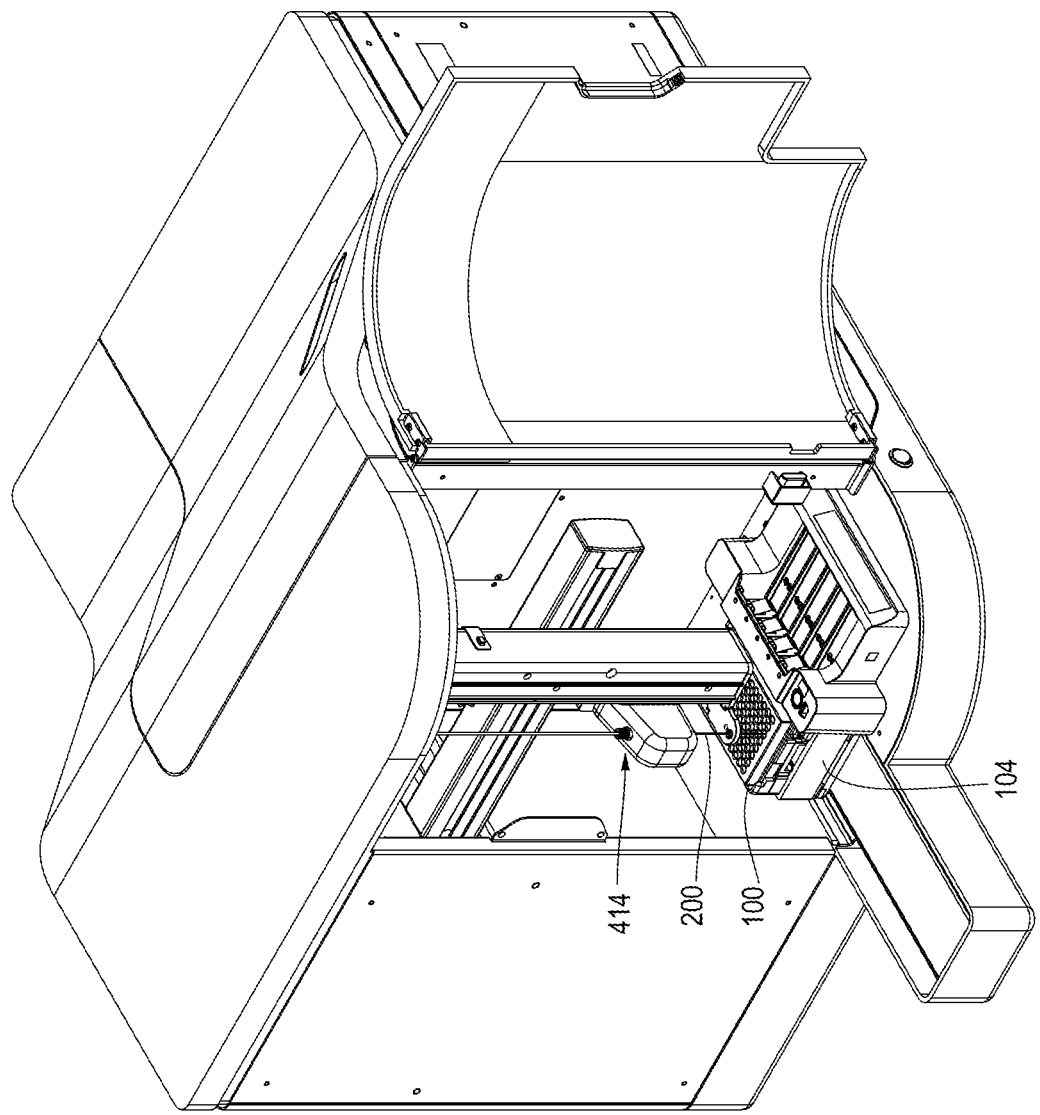
FIG. 11 is another perspective view of the flow cytometer of FIG. 9 with the sample probe in position for withdrawing a sample from one of the wells in accordance with step E of FIG. 1E.

An example of a system in which the present method can be performed is shown in FIGS. 9-11. FIG. 9 is an illustration of a flow cytometer 400 adapted for processing samples, including whole blood samples, in a microwell plate format 100, which includes the shaker 104 and the magnetic adapter 102 assembly of FIG. 2. The instrument shown is the iQue® 3 flow cytometer of the assignee of this invention, however the principles discussed in this example would apply to other analytical devices or flow cytometers. FIG. 9 also shows an associated workstation 410 which is used for displaying analytical results from the flow cytometer. The workstation 410 can include an interface to allow the user to designate certain workflow and processing steps to be performed for a given microwell plate, and associated samples loaded into the microwell plate 100, such as initiate a "whole blood sample module" described below. The flow cytometer can also include a supply of reagents, buffers, cleaning solutions, etc. 402. The flow cytometer 400 includes a loading station 404 where the microwell plate 100 is placed on the shaker 104, a clear plastic partition 412 mounted on hinges which opens to allow access to the interior of the flow cytometer, and a rinse station 406 (FIG. 10).

FIG. 10 is a perspective view of the flow cytometer 400 of FIG. 9, showing the clear partition 412 moved to an open position, showing the shaker 104 moved into the interior of the flow cytometer 400 adjacent to the rinse station 406 where various processing steps can be performed on the microwell plate 100. FIG. 10 also shows a sampling probe 200 connected to a three-axis robotic movement system 414. The movement system 414 is under program control to move in X, Y and Z directions and thus enables all the wells on the microwell plate 100 to be sampled by the sampling probe 200.

The flow cytometer 400 also includes analytical instrumentation for conducting flow cytometry on the immune cells withdrawn from a well of the microwell plate 100, located behind the panels of the flow cytometer shown in FIG. 10, which is conventional and therefore not described in detail in this document for the sake of brevity. The probe 200 withdraws the immune cells from the well and introduces the immune cells into the analytical instrumentation.

Figure 1E:
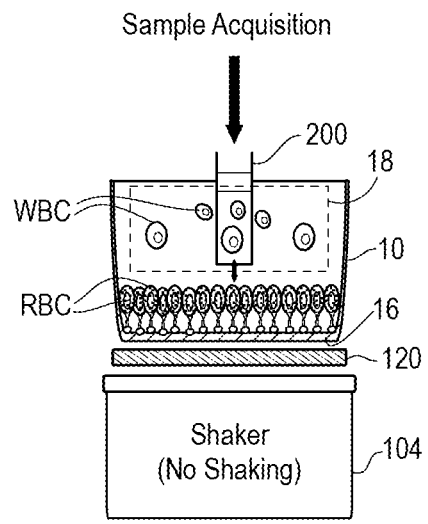

FIG. 11 is another perspective view of the flow cytometer of FIG. 9 with the sample probe 200 in position for withdrawing a sample from one of the wells in the microwell plate 100 in accordance with step E of FIG. 1E and FIG. 6.

The flow cytometer 400 includes a loading station 404 (FIG. 9) which is the location where the user places the microwell plate 100 onto the shaker 104 (with the magnetic adapter 102 positioned on the upper surface of the shaker 104 as shown in FIG. 2). The shaker 104 is connected to a motor-driven electro-mechanical system which then moves the shaker 104 from the loading station 404 (FIG. 9) into the interior of the flow cytometer through an opening in the clear partition 412, see FIG. 10.

In accordance with the method of FIG. 1, the steps A and B of FIGS. 1A and 1B, respectively, are typically performed off-line, e.g., on a laboratory bench. After step B, the microwell plate 100 is then placed on the shaker 104 at the loading station 404, see FIG. 9. By virtue of the magnetic adapter 102 sandwiched between the shaker 104 and the microwell plate 100, the RBCs are pulled down to the bottom of the wells of the microwell plate in accordance with step C of FIG. 10 when the microwell plate is placed on the magnetic adapter. During or immediately after performing step C, the duration of which may for example be 30, 60 or 90 seconds, the shaker is moved from the loading station 404 of FIG. 9 to the interior of the flow cytometer in the position shown in FIGS. 10 and 11.

At step D of FIG. 1D, the shaker 104 is activated for a period of time while the RBCs remain held against the bottom and/or side wall to suspend substantially evenly or homogeneously the immune cells in the sample at the top of the wells in the region 18 (FIG. 1D). This shaking step can be done with the shaker 104 in the loading station 404 of FIG. 9 or in the sample acquisition position shown in FIG. 10.

In step E of FIG. 1E, the shaker 104 is stopped and immediately thereafter the sample probe 200 is lowered, as shown in FIG. 11, into the first well of the microwell plate to withdraw a sample containing substantially only the immune cells in accordance with FIG. 6. The sample probe is operated by the robotic movement system in X, Y and Z directions to sample in the same manner any and/or all of the wells of the microwell plate 100 which hold a sample. After the sample is acquired by the probe 200 using the force from a peristaltic pump or a vacuum pump (not shown), it is delivered to analytical instrumentation (not shown) within the flow cytometer 400, which conducts flow cytometry in a conventional manner. For example, the flow cytometer 400 of FIG. 9 is configured in the manner described in U.S. Pat. Nos. 10,048,191; 9,897,531; 9,797,917; and 6,890,487.

Software Operations

The operation of the shaking and sampling modes of FIGS. 1D and 1E in the flow cytometer of FIGS. 9-11 is governed by software operations and a processor within the flow cytometer 400, which control the operation of the shaker 104, the sample probe 200, and associated 3-axis robotic movement system 414. These operations are within a mode or module of the flow cytometer which is designed to process whole blood samples and is referred to as a "whole blood sample module" or "whole blood sample mode" in the following description. The parameters of this mode can be accessed by the workstation 410 of FIG. 9 and configured by a user, or can be pre-set instructions which are automatically performed when the user selects the whole blood sample module for processing of a given microwell plate.

Module Detection and RBC Pull Down

In FIG. 10, prior to sampling, a probe (FIG. 10, 200) extending from the sampling head 411 (FIG. 10) is lowered until it makes contact with the magnetic adapter 102. Once the probe 200 senses a deck height difference (due to the presence of the magnetic adapter 102 on top of the shaker), the software in the flow cytometer is triggered to alert the user that the system is operating in a whole blood sample module or mode. A predefined waiting period for RBCs pulldown is automatically included in this mode, step C of FIG. 10. If the user selects the whole blood sample module and the probe does not detect the magnetic adapter 102, the run will stop with a warning notifying the user of an error condition.

Automated Optimal Shaking

The software for the flow cytometer automatically adopts a specific whole blood sample module (operating mode) with a specific sample acquisition template. The software then sets a specific shaking speed to suspend the WBCs only, but not the RBCs which remain bound to the bottom or side wall of the well.

For the shaking speed range, in order to maintain the intact layer of RBCs pulled down by magnetic beads while keeping the WBCs homogenously distributed in the top clear liquid within the sample well, the shaking speed range on a BioShake® 3000 is between 100 rpm and 1500 rpm. Above 1500 rpm, the RBCs attached with magnetic beads start to get lifted into the top clear liquid containing WBCs. This maximum speed can be experimentally determined, for example, by observation of the top liquid color and when it changes color from yellow to reddish as the speed is increased. For example, once above 1500 rpm, the top liquid color starts to change from yellowish to reddish or fully red.

Further, the shaking speed range is related to the magnetic or paramagnetic beads materials placed in the biological fluid sample and the magnetic field strength. The reagent with magnetic beads used for proof-of-concept in the present disclosure has nano-magnetic beads (Iron oxide, $Fe_3O_4$) with estimated size between 20-500 nm (diameter). The magnetic beads were conjugated with anti-human CD235 antibody in order to bind to the CD235 molecule expressed on the cell surface of the human RBCs only. Once the magnetic field was present below the well (due to the magnets of the adapter plate), the RBCs bound with the magnetic beads were pulled down to the well bottom.

In general, the optimal shaking speed may also be determined by the eccentricity or amplitude of the shaker itself, and thus the optimal speed of rotation of the shaker may depend on this factor as well.

Automated Acquisition

The software of the flow cytometer operating in the whole blood sample mode will guide the sampling probe to descend such that the tip of the probe is into the top liquid layer of the well with WBCs suspended substantially evenly or homogeneously therein, without touching or disturbing the RBCs at the bottom of the well. See FIG. 6 and FIG. 1E. The sampling time and speed is limited to a certain range to avoid RBCs contamination into the probe. Sampling occurs immediately after shaking stops or during the shaking, with sampling time ranging between 0.5 seconds and 5 minutes per well.

Automated Analysis

After the sample probe 200 has sampled the wells of the microwell plate the sample is introduced into flow cytometer instrumentation per se, which is part of the instrument 400 of FIG. 9. After passage of the WBC sample into the flow cytometer instrumentation, the analytical software for the instrument will perform an automatic data analysis. In one possible configuration this analysis includes automated bead-based sample well identification and immune cell count normalization. The details of the data analysis are not particularly pertinent to this disclosure and can make use of algorithms which are known in the art and described in the patent and technical literature.

Further details on the flow cytometer and sampling arrangement of FIGS. 9-11 is set forth in U.S. Pat. Nos. 10,048,191; 9,897,531; 9,797,917; and 6,890,487, the contents of which is incorporated by reference herein.

Additional Optional Features

The whole blood sample module software ensures that the magnetic adapter 102 is installed correctly on the shaker 104, and when that is verified, locks down the shaking and sampling protocol to appropriate values. Additional cleaning can be automated in the software sampling protocol. The module can also enable specific and automated analysis if marker or counting beads are present. Further, the module can also detect RBCs contamination in the sample, indicating a potential problem with the assay.

In one configuration it is possible to provide a pierceable seal or membrane covering the wells of the microwell plate (e.g., Excel Scientific X-Pierce™ plate seal) that increases biosafety by preventing contamination and spillover in accidents. This is especially important for blood samples which may potentially carry unknown pathogen(s). The seal is applied to the microwell plate after the reagents, such as dyes, and magnetic beads are added to the sample and before the plate is placed on the shaker and magnetic adapter.

In another configuration it is possible to provide in-well marker beads. Such beads can be used for sample well identification (well-ID) for samples with few WBCs due to specific conditions. It is also possible to provide in-well counting beads. Such beads allow for accurately calculating WBC concentration based on the counts of in-well counting beads. Such beads can be added in preliminary step A, off-line on a table top; or they can be part of the reagents which are present in the rinse station 406 of FIG. 10 and introduced immediately prior to shaking operation (step D, FIG. 1D).

Specific assay microwell plates are contemplated for use with whole blood samples, and particularly those that have smaller volumes that is typical for a 96 well plate. This well geometry increases the top layer height with the same volume of sample for easy probe access, minimizes the use of sample/reagent, and reduces the risk of RBC contamination in the sample.

ALTERNATIVE EMBODIMENTS

1. As explained in conjunction with FIG. 1, the principal method for separating immune cells is negative selection of RBCs by the magnetic pulling of magnetic bead-bound RBCs to the well bottom, and the magnet is positioned proximate to the well bottom of the assay plate. An alternative location for the magnet is the gap in-between the adjacent wells so the magnetic field can pull the magnetic bead-bound cells to the side wall of the assay well (19 in FIG. 10). In this configuration, the form factor and design of the magnetic adapter 102 is such that the magnetic adapter includes features which project into spaces formed in the bottom of the microwell plate 100 such that the magnets incorporated therein are proximate to the side walls of the well instead of the bottom of the well.

2. A second alternative method to separate cells is by using hollow or buoyant particles conjugated with molecules of interest, such as antibodies or affimers which can bind to and float any specific cell population to a top surface of the liquid sample in the assay well. For example, it can be possible to float the RBCs to the top of the well, and sample from the lower or middle regions of the well to draw WBCs into the probe. In accordance with this design, a method of sampling immune cells in a liquid sample containing a mixture of red blood cells and immune cells can comprise the steps of: (A) introducing into the sample hollow or buoyant particles designed to bind RBCs, (B) either before or after step (A), introducing the liquid sample into an assay well of a microwell plate; (C) allowing the RBCs to float to a top surface of the liquid sample in the assay by virtue of the binding of the RBCs to the hollow or buoyant particles, the top surface lying above lower and middle regions of the assay well containing the WBCs; and (D) withdrawing with a sampling probe WBCs from the lower or middle regions of the assay well.

3. A third alternative method to separate cells in the microwell plate is to use gradient centrifugation to force multiple liquid layers to form in the sample in the microwells, with each layer containing different cell populations.

4. For all of the above different cell separation methods, after cell separation, the sampling probe descends to a specific layer containing cell/particle population(s) of interest and acquires the sample. The sampling probe can descend to a specific location of the well to sample only one layer or descend to multiple locations in the same well to sample different layers.

5. The sample probe can be just one single probe that descends to one or more locations to acquire one or more layers. An alternative way is to use multiple probes which descend to one or more locations to acquire samples from one or more layers.

6. The methods of this disclosure can be applied to any detection system, e.g. hematology analyzers, cell sorters, mass spectrometers, DNA/RNA analyzer, etc. The methodology of FIG. 1A-1E is accordingly not limited to flow cytometers. Hence the instrument shown in FIGS. 9-11 is offered by way of example and not limitation.

One of the applications of the method of this disclosure is a miniaturized "clinical-trial-in-a-dish" application and expands a flow cytometer's capability to directly acquire/analyze a whole blood sample in a miniaturized format for immunology, immuno-oncology, immuno-toxicity, drug profiling studies, and similar research efforts. The method of this disclosure can be applied to any sampling of one or more particles of interest from a mixed sample in liquid containing RBCs or other uninteresting particles, such as liquid biopsy, cerebrospinal fluid (CSF), chorionic villus sample (CVS), amniotic fluid (AF), cyst fluid sample, bone marrow sample, etc. The mixed sample may be pre-stained with antibodies and other dyes and pre-mixed with different functional beads for simultaneous measurement of cytokines, growth factors, chemokines, hormones, and other biological factors or particles.

We claim:

1. A method for automatic sampling of immune cells from a biological fluid sample deposited in a well of a microwell plate, the well having a wall, the biological fluid sample containing (1) red blood cells (RBCs) and (2) magnetic beads which are designed to bind to the RBCs in the sample, comprising the steps of:
   a) placing the microwell plate on a shaker having a magnetic adapter including at least one magnet, wherein the magnetic adapter is removably coupled to the shaker and the microwell plate is removably coupled to the magnetic adapter, wherein the magnet causes the RBCs bound to the magnetic beads to be held against the wall of the well, wherein a shield comprising a ferromagnetic material is affixed to a bottom surface of the magnetic adapter such that the shield does not directly contact the at least one magnet, wherein the shaker further comprises a sensor, and wherein the shield is configured to shield the sensor from a magnetic field created by the at least one magnet;
   b) shaking with the shaker the microwell plate in a manner and for a time period so as to suspend the immune cells in the biological fluid sample within a region of the well such that the immune cells are isolated from the RBCs held against the wall of the well; and
   c) lowering a sample probe into the well in the region of the well and withdrawing a portion of the sample containing the immune cells from the region.

2. The method of claim 1, wherein the magnetic adapter comprises a structure holding individual magnets, one for each well of the microwell plate, wherein the magnetic adapter is configured to fit onto an upper surface of the shaker and be sandwiched between the upper surface and the microwell plate, and wherein the magnets cause the RBCs to be held to a bottom wall or a side wall of the well.

3. The method of claim 1, wherein the biological fluid comprises whole blood.

4. The method of claim 1, wherein the biological fluid comprises a cyst fluid sample, amniotic fluid, a bone marrow sample, a cerebrospinal fluid sample, a liquid biopsy, or a chorionic villus sample.

5. The method of claim 1, wherein the sample probe is part of a flow cytometer, and wherein the method includes step d) of introducing the portion of the sample containing the immune cells into the flow cytometer.

6. The method of claim 1, wherein the sensor comprises a home position sensor.

7. The method of claim 1, wherein the shaking step comprises the step of operating the shaker in an eccentric rotation at a speed of between 100 rpm and 1500 rpm.

8. The method of claim 1, wherein the magnetic beads comprise magnetic or paramagnetic beads with an estimated size between 1 nm-50 μm, conjugated with a specific molecule that binds to a molecule expressed on the RBCs but not on the immune cells.

9. The method of claim 1, wherein in step a) and c) the shaker is in a non-shaking condition.

10. The method of claim 1, wherein the magnetic adapter including the at least one magnet is integrated into the shaker.

11. The method of claim 1, further comprising the step of placing a pierceable seal over the microwell plate prior to performing step a).

12. The method of claim 1, wherein the sample further includes in-well marker beads or in-well counting beads.

13. The method of claim 1, wherein the magnetic adapter includes at least one recessed pocket, and wherein each of the at least one recessed pocket includes a given magnet of the at least one magnet.

14. The method of claim 1, wherein in step a) the shaker operates in an eccentric rotation at a first speed, wherein in step c) the shaker operates in an eccentric rotation at a second speed, and wherein the second speed is greater than zero but less than the first speed.

15. The method of claim 1, wherein the shaker includes a first pair of locating pins projecting from an upper surface of a first corner of the shaker and configured to contact a first corner of the magnetic adapter, wherein the shaker includes a second pair of locating pins projecting from the upper surface of a second corner of the shaker and configured to contact a second corner of the magnetic adapter, and wherein the first pair of locating pins and the second pair of locating pins are computer-controlled to move into and out of a gripping position to grip the magnetic adapter to thereby hold the magnetic adapter in place.

16. The method of claim 15, wherein the first corner of the magnetic adapter is positioned diagonally opposite from the second corner of the magnetic adapter.

17. The method of claim 15, wherein a third corner of the magnetic adapter includes a first corner feature and a fourth corner of the magnetic adapter includes a second corner feature, wherein the third corner is diagonally opposite the fourth corner, and wherein the first corner feature and the second corner feature are designed to hold the mircrowell plate in place.

18. The method of claim 15, wherein the magnetic adapter includes a first pair of recesses configured to receive the first pair of locating pins, and wherein the magnetic adapter includes a second pair of recesses configured to receive the second pair of locating pins.

19. The method of claim 1, wherein a first side of the magnetic adapter includes a first resilient gripping skirt extending down from a bottom surface of the magnetic adapter, wherein a second side of the magnetic adapter includes a second resilient gripping skirt extending down from the bottom surface of the magnetic adapter, wherein a first side of the shaker includes a first recess configured to receive the first resilient gripping skirt of the magnetic adapter, and wherein a second side of the shaker includes a second recess configured to receive the second resilient gripping skirt of the magnetic adapter.

* * * * *